Dec. 14, 1943. A. P. WELSH 2,336,905
VEHICLE DIRECTION SIGNAL
Filed April 21, 1941 2 Sheets-Sheet 1
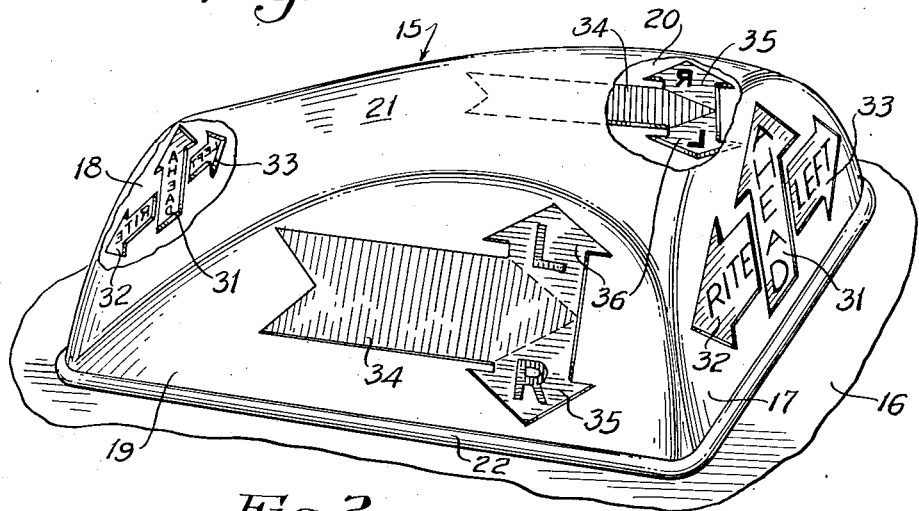
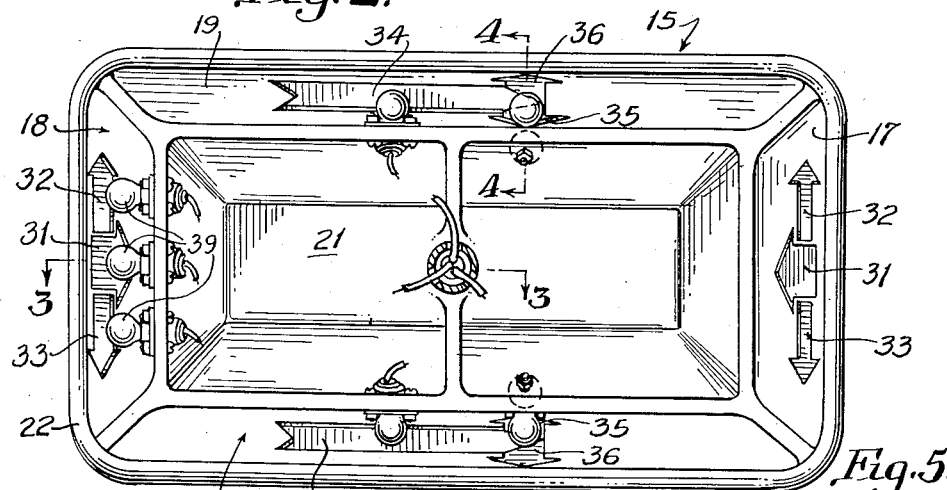
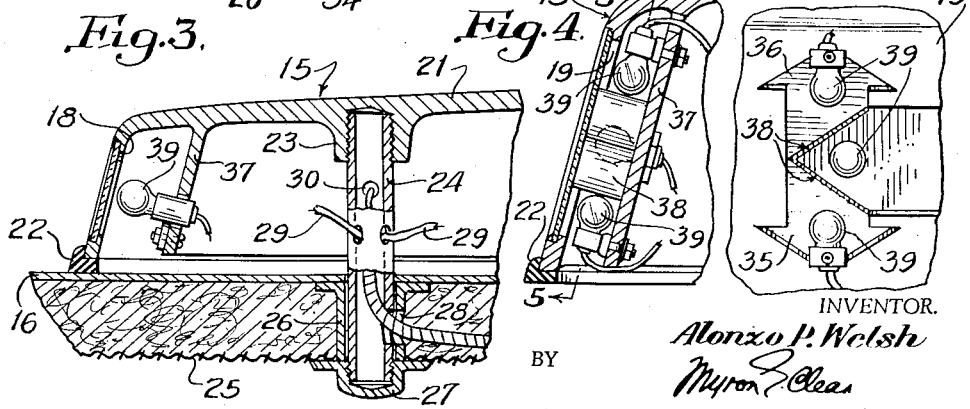
INVENTOR.
Alonzo P. Welsh
BY Myron S. Clear
ATTORNEY.

Dec. 14, 1943.                A. P. WELSH                2,336,905
                         VEHICLE DIRECTION SIGNAL
            Filed April 21, 1941              2 Sheets-Sheet 2
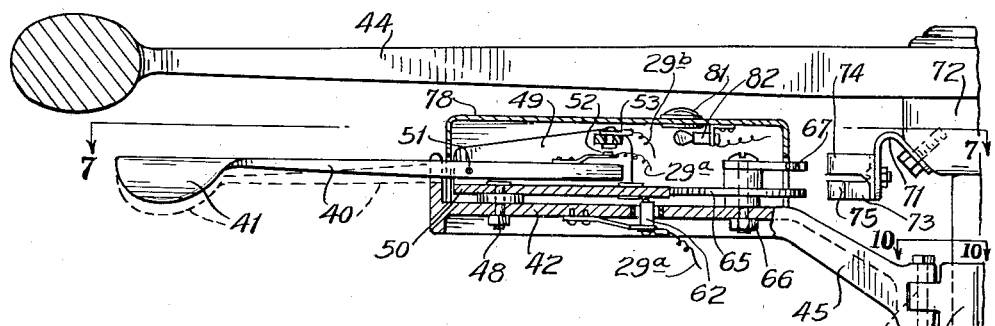
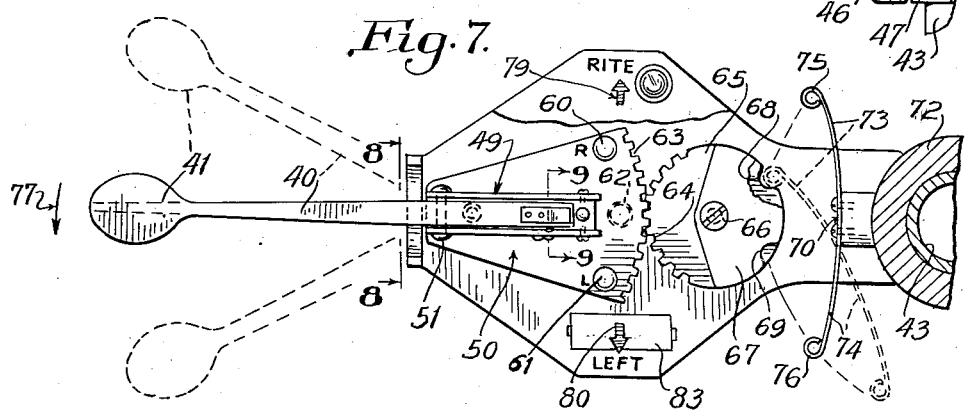
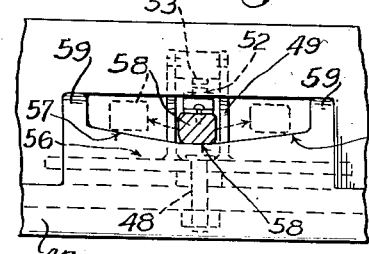 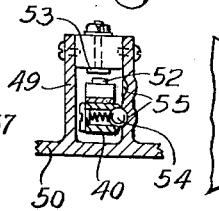 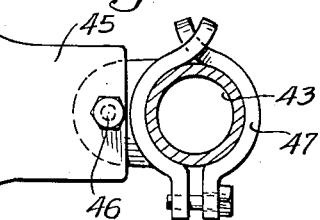
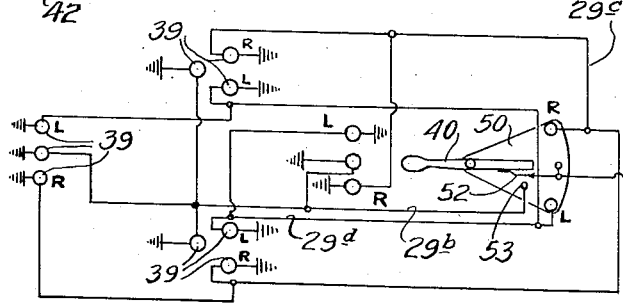
INVENTOR.
Alonzo P. Welsh,
BY
ATTORNEY.

Patented Dec. 14, 1943

2,336,905

UNITED STATES PATENT OFFICE 2,336,905

VEHICLE DIRECTION SIGNAL

Alonzo P. Welsh, Lynwood, Calif.

Application April 21, 1941, Serial No. 389,526

1 Claim. (Cl. 177—329)

The present invention relates generally to vehicle signals, and more particularly to direction indicating signals by means of which, in the interests of traffic safety, the driver of an automobile or other motor car may signal his intended direction of movement in approaching turns and intersections in a manner which will be plainly visible. It is one of the primary objects of the invention to arrange for the extension of this visibility to all traffic approaching, following or at either side of the signalling vehicle.

It is another object of the invention to provide a vehicle signal of the above type including a conveniently arranged signal control means of a combined manual and automatic nature which may be readily installed, and easily operated both from a manual and also an automatic standpoint.

With the above general objects in mind, further and more specific objects relating to simplicity, economy and durability will be better understood and more thoroughly appreciated in the course of the detailed description to follow.

The invention embraces the construction, combinations and arrangements which, in the detailed description thereof, will be referred to by numerals in connection with the accompanying drawings. In the consideration of these drawings it is to be understood that the specific disclosure of various of the parts, as well as combinations of such parts, is to be taken as merely exemplary of the best mode so far devised for carrying the invention into practical use. In these drawings, furthermore, Figure 1 is a perspective view, partly broken away, of the visible signal exhibitor, or signal member.

Figure 2 is a bottom plan view thereof.

Figure 3 is a partial vertical, longitudinal sectional view through the signal exhibitor, taken substantially on line 3—3 of Figure 2.

Figure 4 is a partial vertical, transverse sectional view through the exhibitor, taken substantially on line 4—4 of Figure 2.

Figure 5 is a detail vertical sectional view, taken substantially on line 5—5 of Figure 4.

Figure 6 is a view partly in side elevation and partly in vertical section, through the signal control means.

Figure 7 is a sectional top plan view of the parts seen in Figure 6, viewed along the line 7—7 of said figure, and with substantial portions of the switch case or cover broken away.

Figures 8 and 9 are detail transverse, vertical sectional views, taken respectively along the lines 8—8 and 9—9 of Figure 7.

Figure 10 is a detail horizontal sectional view taken along the line 10—10 of Figure 6, and, Figure 11 is a diagrammatic view, illustrating a convenient arrangement of electrical connections.

Referring now to the above described figures of the drawings, and more particularly to the signal exhibitor as shown in Figures 1 to 5 inclusive, a signal casing is generally indicated at 15, for disposition at a suitable or desired point on the turret top of an automobile or other motor car or vehicle, a portion of which top is indicated at 16 in Figures 1 and 4, to provide for full view of the casing from all points of the compass.

For the above purpose, the casing 15, open at its bottom, has four, flattened and vertically inclined side wall sections 17, 18, 19 and 20, and a curved, streamlined top 21, the curvature of which carries over and downwardly between said wall sections to thus eliminate corners and corner edges down to its lower edge surrounding its open body.

It is contemplated the casing may rest upon a vehicle top with its lower edge seated on an interposed sealing ring, frame or member 22 of flanged or other form, and of rubber or other suitable material with which the said lower edge of the casing 15 may conveniently form a weather seal.

As seen particularly in Figure 3, the approximately central portion of the casing top 21 has an internally threaded boss therein, receiving the threaded upper end of a tubular upright anchoring member 24. The lower portion of this member 24 depends through an opening formed for its reception in the turret top 16, and has a portion below said top opening of a length to extend substantially to the upholstery of the vehicle. Around this latter portion of the anchor tube 24, above the upholstery 25 as in Figure 3, may be placed a thimble or sleeve 26 with its upper end against the lower surface of the top 16, so that an acorn or other nut 27 threaded on the lower end of tube 24 will have bearing against the lower end of said thimble or sleeve, at the line of the upholstery, to thus draw the signal casing 15 snugly down against the vehicle top in weatherproof seating relation on the rubber or other frame 22.

The anchor tube 24 and thimble 26 are slotted at 28 to permit of feeding the current carrying wires 29 upwardly into the tube from the space above the upholstery 25, and the tube has openings 30 within the signal casing 15 through which such wires may radiate to the lighting bulbs or lamps for the signal windows as presently described.

In the flattened side walls of the signal casing 15 are formed signal windows as by means of transparent sections in the nature of glass-covered cut outs, it being contemplated that the front and rear walls 17 and 18 may have similar windows in the form of a central upright arrow 31 indicating straight ahead movement, and oppositely extending side arrows 32 and 33 indicating respectively right and left turns.

It is further contemplated that if color is desirable, and is to be used, the transparent cover of arrow 31 may be colored amber, that of arrow 32 may be colored green, and that of arrow 33 may be colored red. However other distinguishing colors may be used.

The side walls 19 and 20 may each have a similar form of transparent window arrangement, as for instance, a single horizontal arrow stem 34, and oppositely vertical arrow heads 35 and 36 at the forward end of the stem. The stem 34 will be lighted when proceeding straight ahead, and arrows heads 35 and 36 respectively lighted when right and left turns are to be made. If colors are used, stem 34 will be of one color and arrow heads 35 and 36 of different colors, for example corresponding to those of the front and rear indicating arrows 31, 32 and 33.

Within the casing 15 any suitable means may be used to bring about individual lighting of the several arrows, although it is to be understood corresponding signals are simultaneously exhibited at all sides of the casing. The walls of the casing may be paralleled by inner partitions 37 and shields 38 may be used as in Figures 4 and 5, so that the several bulbs or lamps 39 will light the corresponding signal windows individually with proper wiring, as for example according to the diagram Figure 11. The several bulbs or lamps 39 will be grounded at one side through the partitions 37 and anchor tube 24, or through any other suitable means, to the car frame, and current will be furnished as for instance from the car battery through suitable control connections, the description of which follows.

Within the vehicle is a combined manual and automatic control arrangement consisting of a switch, the manual control feature of which is a switch lever or arm 40, having a handle or finger piece 41 at its outer end. As best seen in Figures 6 and 7, this switch has a bottom supporting plate 42 which is rigidly held in a horizontal position adjacent the steering post or column 43, and to the left thereof beneath the steering wheel 44, upon the outer end of an inclined supporting arm 45 whose lower inner end is securely fixed at 46 to one part of a two-part clamp 47 rigidly embracing the steering column 43 in the manner, as for example, shown in Figure 10.

Mounted in a horizontally disposed and swingable position slightly above, and parallel with, the bottom plate 42, on a pivot post 48 upstanding from the latter, is a segmental switch plate 50 provided with centrally disposed, lengthwise upstanding wings 49 in spaced parallel relation to receive between them the inner end portion of the switch lever 40. These wings 49, adjacent to the outer ends thereof, support the intermediate pivot 51 of lever 40, on which the latter is swingable in a vertical plane so that upon depression of its outer handle 41 below the normal horizontal position of said lever as seen in Figure 6, its inner portion is raised between the wings 49 to a point where a spring-supported contact member 52, carried thereby and connected to a current feed wire 29ᵃ in the diagram Figure 11, is engaged with a stationary contact piece 53 supported by the upper inner end portions of the wings 49 and connected to wire 29ᵇ of the diagram Figure 11, for the lamps indicating straight ahead.

Preferably the inner portion of switch lever 40 is held against accidental displacement in the upper and lower positions thereof, as by means of a spring actuated ball check 54 carried thereby as shown in Figure 9, one of the wings 49 of the switch plate 50 having vertically spaced recesses 55 in which the ball check seats in its respective normal and active positions with regard to the signal for straight ahead driving.

It is obvious from the foregoing that the switch lever 40 may swing bodily in a horizontal direction to cause similar movement of the switch plate 50 in either direction from its normal central or neutral position shown in Figure 6 for purposes which will be presently made plain. It is also apparent that the beforementioned vertical swinging movements of the switch lever are independent of any horizontal switch plate-actuating movements thereof, although depression of the switch lever 40 is limited to the extent that it can only occur when the switch plate is in neutral position, and if it has been depressed and is subsequently shifted horizontally, it will be returned to its normal horizontal position when so shifted.

To effect the above, the adjacent outer end of the supporting plate 42 has a short transversely disposed upright wall 56 below the lever 40 at a point outwardly beyond its pivot 51, as best seen in Figures 6, 7 and 8. This wall 56 has its upper edge inclined upwardly in opposite directions, as at 57, from its central portion 58 on which the lever 40 rests when depressed to engage contacts 52 and 53, as in Figure 8.

Thus, if lever 40 is shifted horizontally in either direction for swinging the switch plate 50, one of the inclined edges 57 will act as a cam to force the lever 40 upwardly to its neutral position and disengage contacts 52 and 53. This action, which is important as we shall later see, is plainly indicated in Figure 8. Preferably the wall 56 has upstanding lugs 59 which serve to properly limit the horizontal swinging movements of lever 40 and consequently those of the switch plate 50.

At its inner larger end, remote from its pivot post 48, switch plate 50 has a pair of insulated contact buttons 60 and 61, respectively for the right and left turn signals. These buttons are respectively connected to wires 29ᶜ and 29ᵈ of the diagram, Figure 11. Below the central portion of the switch plate, the bottom supporting plate carries a spring supported contact piece 62 which is held upwardly into engagement with the switch plate 50 in the arc or path of movement of buttons 60 and 61. This contact piece is also connected to the current feed wire 29ᵃ, as in the diagram Figure 11, so that when the button 60 engages the same, current will be fed to all of the right turn signals or signal lamps, and when the button 61 engages the contact piece current will be fed to all of the left turn signal lamps.

The inner curved edge of the segmental switch plate 50 is also toothed as at 63 and in mesh with the toothed edge portion 64 of a disc 65, rotatably disposed on an axial pivot post 66 upstanding from the supporting plate 42 near its inner end.

The disc 65, above mentioned, is of course disposed in the plane of the switch plate 50 with which it meshes, and in addition, it is mounted and connected to form a movable unit with an upper segmental disc 67. Disc 65 has, at its inner portion, a peripheral notch 68, and the upper disc 67 has a similar peripheral notch 69, the latter in circumferentially offset relation to the notch 68. In this way the two notches 68 and 69 are spaced vertically and also located in the normal position of the parts, upon relatively opposite sides of a line connecting the disc and switch plate pivot posts 48 and 66, as plainly seen by a comparison of Figures 6 and 7. This arrangement provides for automatic operation or control of the signal switch by virtue of connections as follows.

A bow-shaped spring actuator 70 is supported on a bracket 71 fixedly secured to the hub 72 of the steering wheel, so that the latter when maintaining the steering wheels for straight ahead driving, positions the actuator 70 adjacent, and at right angles to, the switch supporting plate 42, and thus near, though spaced from, the discs 65 and 67.

The actuator 70 has one spring arm 73, extending in one direction in the horizontal plane of the disc 65, and another spring arm 74 extending in the opposite direction and in the plane of the disc 67. Both of these spring arms 73 and 74, it will be noted, have their ends bent to form similar engaging heads 75 and 76.

Thus if switch lever 40 is swung by hand horizontally in the direction of the arrow 77 in Figure 7, the switch plate 50 will be shifted in the opposite direction until its contact button 61 engages contact piece 62 whereupon in the diagram Figure 11, current will flow from feed wire 29a through feed wire 29d to the several left turn signal lighting lamps. At the same time, the assembly of discs 65 and 67 will be partially rotated in a clockwise direction so that the notch 68 of disc 65 will be shifted past the center line, and notch 69 of disc 67 will be shifted out of range of engagement by the spring bow 70. When the turn is to be made toward the left, and in the making of such turn, the head 75 of spring arm 73 will move counterclockwise against, and flex along, the peripheral edge of disc 65 without encountering its notch 68, but when, after the turn is made, the actuating bow 70 is moved in the opposite direction, its head 75 will enter notch 68 and will, in the further movement of the steering wheel in the return to normal straight ahead movement, rotate the discs back to normal position, with a corresponding shifting of the switch plate and switch lever to neutral position. The same operation takes place with the cooperation of spring head 76 and notch 69 of disc 67 after a right hand turn has been made, and thus, after a manual settling has been made, and the indicated turn has been accomplished, the manually set switch parts will be automatically returned to neutral position after the indicated turn has been made, and during straightening of the vehicle on its new course, to thus erase the previously set signal.

Similarly, should no turn signal be manually set prior to a turn of the vehicle, it is obvious that the proper signal will be set automatically through the means just described during the turn, and erased by the same automatically acting means when the vehicle is again straightened out after the turn has been made.

Should the straight ahead signal be set by manually depressing the switch lever handle 41, and a turn signal subsequently set either manually or automatically, the straight ahead signal will be erased during the setting of the turn signal, in the manner previously set forth.

Preferably the switch is completed by a protecting cover 78, shown in Figure 6, which seats on the supporting plate 42, with edge recesses for accommodating the externally projecting parts, namely the switch lever 40 and the notched peripheral portions of the discs 65 and 67 to be engaged by the automatically acting spring bow 70. This cover 78 may have appropriately disposed surface arrows 79 and 80, indicating the direction of swinging movement of the handle end of lever 40 in the respective setting of right and left turn signals. The cover may also have, as shown in Figure 6, a signal window 81 and a lighting bulb or lamp 82 thereupon which is connected in any suitable manner so that it is lighted upon the engagement of any of the signal setting switch contacts, to thus act as a check and show the operator a signal has been set and that the signal apparatus as a whole is functioning.

It is believed to be obvious from the foregoing that the invention may be applied with equal facility as equipment on new cars, and as an attachment for cars already in use, since the clamp 47 and the adjustable connection of supporting arm 45 thereto by clamping bolt 46, provides for a wide range of adjustment to cars of different makes, and to permit of disposition of the switch supporting plate 42 in a manner which will permit of easy and convenient manipulation of the switch lever 40.

If it is so desired, an ordinary flasher coil and the like, indicated at 83 in Figure 7 on the switch supporting plate 42, may be suitably connected in the controlling circuit of the signal lamps so that, when lighted, the lamps will flash on and off to thus draw attention in a greater degree to the signals.

Having thus fully described and otherwise disclosed the invention, what is claimed is:

In a direction signal, a signal exhibitor comprising a casing for disposition on the top of a vehicle, said casing being in a single piece, including a rounded, dome-like top and flat, signal bearing side and end walls, forming a generally rectangular, open bottom, a sealing member around, and engaged by, the lower edges of said walls, a connecting member depending within and below the casing, having its upper end in threaded connection with an internal portion of the said top, and means on the lower portion of said member for clamping engagement with the top of a vehicle for clamping the casing tightly on said sealing member, the said connecting member being tubular and having wall apertures above and below the lower edge of the casing.

ALONZO P. WELSH.